(12) United States Patent
Borza (10) Patent No.: US 6,333,989 B1
(45) Date of Patent: Dec. 25, 2001

(54) CONTACT IMAGING DEVICE (75) Inventor: Stephen J. Borza, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 09/277,819

(22) Filed: Mar. 29, 1999

(51) Int. Cl.[7] .................................................. G06K 9/00
(52) U.S. Cl. ................................... 382/124; 250/556
(58) Field of Search .................................. 382/124, 125, 382/127, 294; 283/68; 356/71; 250/556; 704/246, 273; 705/1, 26, 42; 340/5.53, 5.83

(56) References Cited

U.S. PATENT DOCUMENTS

| | | | |
|---|---|---|---|
| 4,933,976 | * 6/1990 | Fishbine et al. | 382/127 |
| 5,325,442 | * 6/1994 | Knapp | 382/124 |
| 5,864,296 | 1/1999 | Upton | 340/825.3 |
| 6,002,815 | 12/1999 | Immega et al. | |
| 6,097,035 | 8/2000 | Belongie et al. | |

FOREIGN PATENT DOCUMENTS

WO 99/36880  7/1999  (WO) .

* cited by examiner

Primary Examiner—Samir Ahmed
(74) Attorney, Agent, or Firm—Freedman & Associates (57) ABSTRACT

A fingerprint sensing device and recognition system includes a capacitive array of sense elements in conjunction with a means of determining motion of a surface being imaged. A plurality of images is combined to form a composite image having an area that is greater than the area of a single captured image. The sensing device is disposed between protective surfaces and supported by a flexible structure.

7 Claims, 6 Drawing Sheets

Figure 1

Prior Art

Figure 2

Prior Art

CONTACT IMAGING DEVICE

FIELD OF THE INVENTION

This invention relates generally to imaging devices and more particularly to contact imaging devices for imaging fingerprints and the like.

BACKGROUND OF THE INVENTION

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

One of the problems associated with fingerprint sensors concerns the reliable and accurate transformation of ridge and valley pattern of the fingertip into electrical or optical signals to be stored in a digital format. Optical systems as described above, for example using a prism, require sophisticated equipment and tend to be bulky and costly.

In an attempt to overcome some of the limitations and disadvantages of using optical systems based on illumination of the finger tip, U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

While the described sensor may not suffer from the problems associated with the kind of sensor employing an optical sensing technique, it suffers from its own problems. For example, applying a voltage to the array of capacitors requires circuitry to each capacitor for charging. Such charging also requires further states in the imaging process consuming more resources and providing added areas for unreliability. Moreover, the need to provide a respective connection to each individual capacitor in the array means that a very large number of connecting lines is necessary. This creates difficulties, both in the fabrication of the sensing member and its interconnection with the detection circuit.

In yet another attempt to improve upon deficiencies and limitations of the aforementioned and other prior art, a further contact imaging device is described in U.S. Pat. No. 5,325,442 in the name of Knapp, issued Jun. 28, 1994. Those parts of the disclosure of this patent not included in this specification are incorporated herein by reference.

Knapp describes making a capacitance measuring imaging device in the form of a single large active matrix array involving deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

Although Knapp attempts to provide an improvement over Tsikos mentioned above, other disadvantages and limitations become evident in the manufacture implementation of Knapp's disclosed device. Firstly, it is extremely difficult to produce a single large imaging contact device, for example comprised of a single silicon die cut from a silicon wafer. Fabricating a device with a contact area of 0.75 inches by 0.75 inches or larger, approximately a required dimension for imaging a fingerprint, is impractical due to the fragile nature of silicon devices. Aside from large dies being costly to manufacture, they have lower manufacturing yields than smaller dies. When square or rectangular dies are cut from a substantially round silicon wafer, there is less loss at the edges of the wafer when small dies are cut. The mechanical strength of these chips also limits their use in contact applications; for instance, the force of a finger contacting and resting upon a large die can cause a crack or stress fracture. Furthermore, current, conventional photolithographic systems are typically equipped for the production of dies that have a maximum dimension of about 0.4 inches to 0.5 inches.

Two-dimensional arrays used for capacitive imaging of fingerprints are expensive, subject to cracking when used over a period of time and so forth. This fragility and cost limits the widespread use of capacitive imaging of fingerprints.

A fingerprint sensing device and recognition system that includes an array of closely spaced apart sensing elements each comprising a sensing electrode and an amplifier circuit is described in U.S. Pat. No. 5,778,089 in the name of Borza, issued Jul. 7, 1998. The device is used to sense electrical charge on a fingertip and obviates the need to pre-charge the sensing electrode. The device may be constructed with a single die or with multiple dies. Those parts of the disclosure of this patent not included in this specification are incorporated herein by reference.

In order to reduce the overall size of a capacitive fingerprint imager, it would seem necessary to reduce the overall imaged area. Unfortunately, because humans are not precise in finger placement, this makes identification difficult or impossible. A smaller capacitive fingerprint scanner would be advantageous due to lower manufacturing costs, improved robustness, and so forth. Also, the small area required is highly advantageous for embedded applications such as with a cell phone, a telephone, a computer (laptop) and so forth.

OBJECTIVE OF THE INVENTION

Thus, in an attempt to overcome these and other limitations of known prior art devices, it is an object of this invention to provide a contact imaging device that is relatively inexpensive and practicable to manufacture.

It is a further object of the invention to provide a contact imaging device that is robust.

SUMMARY OF THE INVENTION

In accordance with the invention there is provided a capacitive fingerprint sensing device comprising:

(i) a first sensing pad, having a specific capacitive detective area, for sensing variation in a biological surface;

(ii) a second sensing pad for detecting motion of the sensed variation; and (iii) a processor for correlating between data previously received from the first sensing pad and data received from the second sensing pad to provide correlation results, the correlation results indicative of a known physical distance between data sensed by the first sensing pad and the data sensed by the second sensing pad, whereby a biological surface passed over the first and second pads and having a larger area than the specific detective area is capable of being imaged.

In accordance with another aspect of the invention there is provided a method of imaging a fingerprint comprising the steps of:

(i) moving a biological surface relative to a first sensing pad and a second sensing pad, the sensing pads including a capacitive array of sensing elements;

(ii) capturing a plurality of images of the biological surface, some images of different portions of the biological surface;

(iii) determining motion of the biological surface relative to the first sensing pad using the captured images; and (iv) constructing an image of the biological surface from the captured images to form a composite image, wherein the area of the composite image is greater than the area of a single captured image from the plurality of images.

In accordance with the invention there is further provided a method of imaging a fingerprint wherein the step of moving a biological surface relative to an image reader is performed by moving a biological surface relative to a first sensing pad and a second sensing pad, the sensing pads separated by a known distance;

wherein the step of capturing a plurality of images of the biological surface comprises capturing first images with the first sensing pad and second images with the second sensing pad;

wherein the step of determining motion of the biological surface comprises the step of correlating first images with second images; and wherein the step of constructing an image of the biological surface comprises the step of storing the first images and the second images within an image space having a known scale, the images stored at determined distances when known and image locations within the image space adjusted in dependence upon known distances.

As a fingertip is passed across a first sensing pad and then a second sensing pad, successive rows across the fingertip are imaged. The resulting rows are known in one path dimension but the spacing of the rows along the other dimension is unknown. Therefore, a comparison of the imaging results from the first sensing pad and those from the second sensing pad is used to determine spacing and thereby allow for fingerprint reconstruction. The second sensing pad does not need to be as topographically sensitive as the first sensing pad. In this regard, the second sensing pad may have a lower resolution than the first sensing pad thereby reducing component costs. Resolution is generally defined in terms of dots per inch across an image. Therefore, more imaged dots—pixels—across a fingertip results in an image of higher resolution. Alternatively, an imager having a narrower imaging span is used as the second sensing pad. For example, the second sensing pad images only half a width of a fingertip.

In a simplified version, the measurement requires that the data acquired from the first sensing pad be fed to a correlator for correlation with data as being imaged by the second sensing pad. When substantial correlation results the distance the fingertip has moved, $\Delta d$, is known and the first row imaged at that time is the distance $\Delta d$ from the previously imaged first row. Subsequent data from the fingertip is read and loaded into the correlator. This offloads image reconstruction from the computer, where it might have been done.

Alternatively, a unified sensing pad is used, i.e. the first sensing pad and the second sensing pad are one and the same. Of course, when this is the case, the sensing unified sensing pad has at least two rows separated by a predetermined distance $\Delta d$. By comparing successive frames of data from the unified sensing pad motion is sensed as the fingertip moves. A whole image is reconstructed from these successive frames.

Optionally, the level of fingerprint reconstruction is set at a predetermined level. The predetermined level is met, for example, by reaching a threshold of positive comparison with stored image data, i.e. recognizing a fingerprint image.

The mechanical strength of chips and their electrical linkages limit their use in contact applications. A sensing pad in the shape of a narrow rectangular strip, for example 1 mm×20 mm, will be susceptible to deformation when subjected to a force central about the length of the strip. In contrast, a sensing pad, for example 20 mm×20 mm, the approximate size of a fingerprint distributes a central force over a larger area than a rectangular sensing pad. In a preferred embodiment a support layer, preferably a ceramic layer, strengthens the rectangular strip. For added support the sensing pad is more preferably disposed between support layers and held by a flexible membrane. The flexible membrane reduces deformation of the sensing pad when the sensing pad is in contact with a finger. The flexible membrane is much less susceptible to fatigue than a chip or its electrical linkages. The flexible membrane is preferably made from a synthetic polymer. As an alternative preferred embodiment, the sensing pad is held within a body of greater flexibility than the image reader.

In another preferred embodiment a rigid boarder, around the sensing pad, is in contact with the finger as data is read, thereby reducing unwanted forces on the sensing pad. In addition, the sensing pad is preferably counter sunk allowing the boarder to distribute pressure whilst allowing the finger to mold to the shape of the depression.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

A sensing device according to this invention comprises a substantially flat surface for receiving a fingertip. Below the surface are a sensor array and a measuring array. The arrays comprise sensing elements which are designed to sense induced electrical charge. The distance between the fingertip and individual sensing elements should generally be kept to a very small gap in order to retain a high signal to noise ratio.

Figure 1:
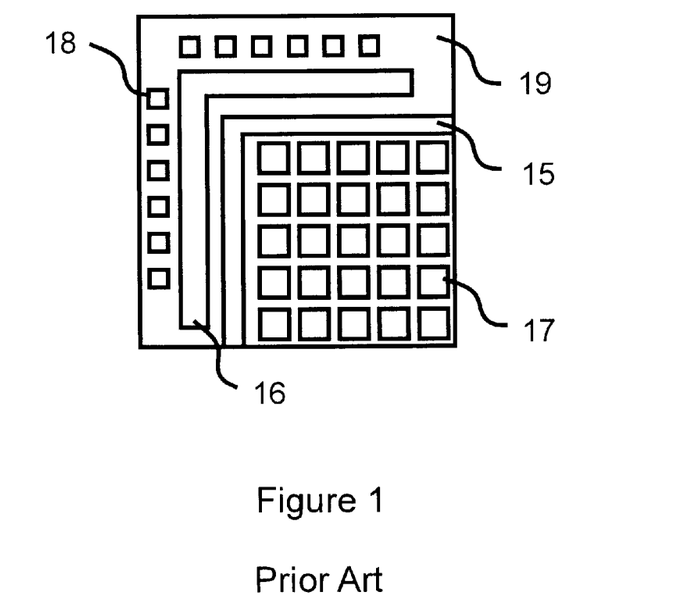
FIG. 1 is a simplified diagram of a prior art sensing device showing an array of sensing elements together with associated addressing circuitry, the size of the sensing device surface is consistent with the size of the surface to be sensed.

Referring to FIG. 1, part of a prior art sensing device implemented on a semiconductor chip is shown. The device comprises a single active matrix addressed sensing pad 19 having an X-Y array of sense elements consisting of r rows (1 to r) each having c sensing elements 17. In practice there are about 300 rows and 200 columns of regularly spaced elements occupying an area of approximately 2 cm×3 cm. This area is for accepting a fingertip for scanning.

Preferably sensing elements 17 are disposed in such a fashion that a smallest desired feature of a fingerprint is evident in the sensed data. The placement and spacing of the sensor elements allows an image of a fingerprint, once scanned, to contain all required features for analysis. A sensing element 17 is preferably smaller than half the smallest sensable feature size in order to generate such an image. Empirical studies have shown that a square plate of about 50 $\mu$m edge length is suitable for fingerprint sensing.

The array of sensing elements 17 is connected through an analog switch matrix to facilitate reading the fingerprint image out of the sensing pad 19. Timing and sequencing logic 16 selects each element in the array, in turn, to produce a complete image of a fingerprint presented to the device. The signal is output directly as an analog signal or, alternatively, is converted to a digital signal prior to output from the device.

The sensing pad 19 further comprises a ground ring 15 and bonding pads 18 designed for connection to other components or to packaging. The ground ring 15 also serves to provide a common ground for the sensing pad. In this role, it is important that the ground ring 15 and integrated circuit elements be designed so as to minimize noise to each sensing element 17. The signal to noise ratio that is acceptable varies between applications and should be adjusted to meet the needs of a specific design. When possible, packaging should be selected to limit noise.

Figure 2:
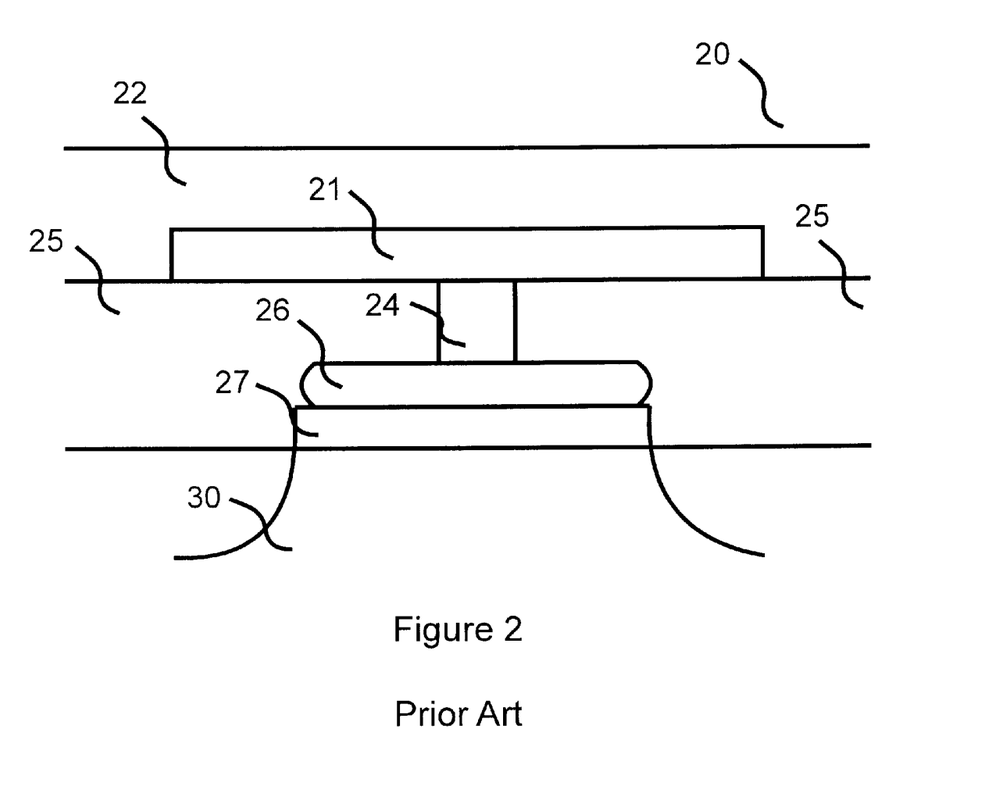
FIG. 2 is a simplified diagram of a prior art sensing element.

Referring to FIG. 2, a prior art single sensing plate 20 is shown. Such a sensing plate 20 is designed for use in arrays and is smaller than half the smallest sensable feature size as indicated above. Charge sensing electrode 21 is connected to an active element which is shown as a three terminal switching device in the form of a field effect transistor (FET) having a source, a drain, and a gate 26. The gate 26 is connected to the sensing electrode 21 by an interconnect 24. Disposed between the gate 26 and the transistor 30 is a gate oxide 27.

Figure 4:
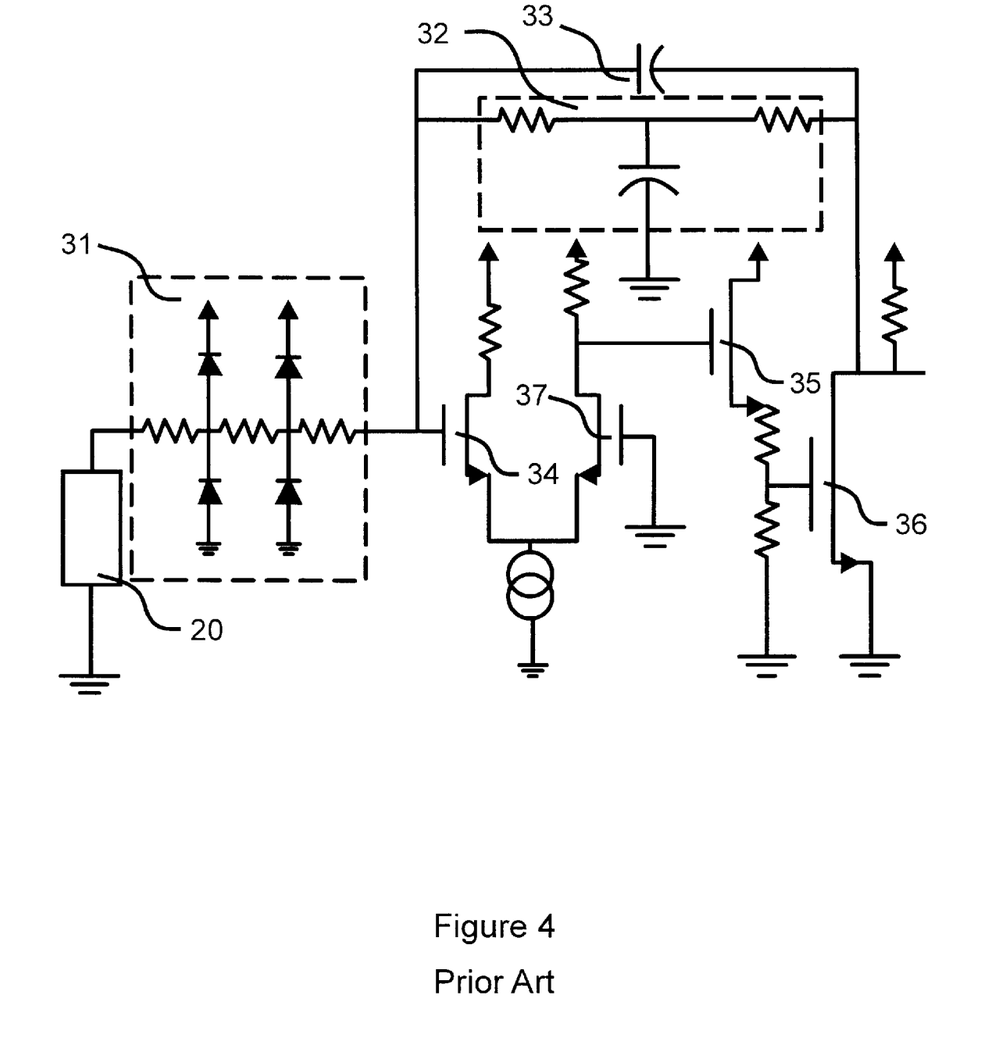
FIG. 4 is a schematic diagram of an amplifier circuit in the form of a differential amplifier for use with the present invention.

Above the charge sensing electrode 21 is disposed an overglass 22 which serves to protect the charge sensing electrode 21 and to space the electrode and a fingertip presented thereto. Below the charge sensing electrode 21 is disposed a field oxide 25. A finger placed against the overglass 22 induces charge in the charge sensing electrode 21. The charge so induced is greater for portions of the fingertip which are in contact with the overglass 22—ridges—than for those portions of the fingertip spaced from the overglass 22—valleys. By amplifying the charges so induced with an amplifier circuit such as is shown in FIG. 4, the induced charges are rendered easily distinguishable.

Assuming that the charge density on the fingertip is substantially even, induced charges on the charge sensing electrode 21 depend solely on the distance between the charge sensing electrode 21 and the skin of the fingertip inducing the charge. Further, as the induced charge falls off with the distance, the closest skin of the fingertip will induce a larger proportion of the charge. The present invention is employed in the above fashion to image fingertips or more accurately to image fingerprints without a need for an initial predetermined charge on the sensing electrodes 21.

Figure 3A:
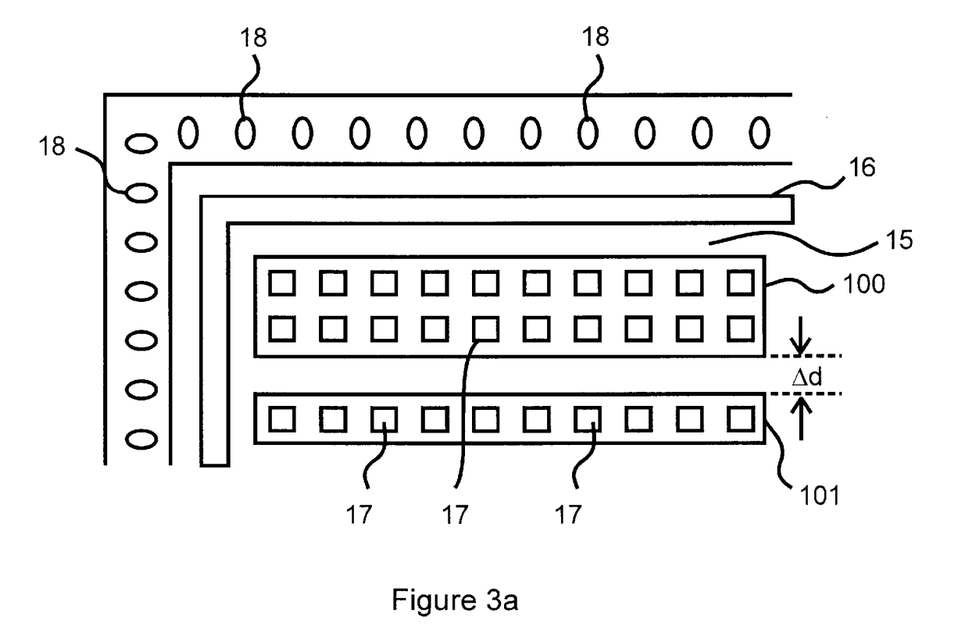
FIG. 3a is a simplified diagram of a sensing device according to the present invention showing a first sensing pad and a second sensing pad forming a measuring array.

Referring to FIG. 3a, part of a first sensing device on a semiconductor chip is shown comprising a single active matrix addressed first sensing pad 100 having an X-Y array of sense elements including r rows (1 to r) with c sensing elements 17 in each row. In practice there are about 10 rows and 300 columns of regularly-spaced elements occupying an area of approximately 0.1 cm×2 cm. Sensing elements 17 are sized and disposed in such a fashion that they are capable of distinguishing the smallest desired feature of a fingerprint. The placement and spacing of the sensor elements should allow an image of a fingerprint, once scanned, to contain sufficient features for analysis. Preferably, in order to generate an image for analysis, a sensing element 17 is smaller than half the smallest feature size to be sensed.

Adjacent the first sensing pad 100 is a second sensing pad 101 for use in determining motion of a sensed fingertip. Because of the random nature of fingerprint data, a scan line across a fingertip is unlikely to match a second other scan line across the same fingertip unless both scan lines are of a same portion of the fingertip. Therefore, when the sensed fingerprint data sensed by the second sensing pad 101 is substantially the same as data previously sensed by the first sensing pad 100, the fingertip is known to have moved a predetermined distance $\Delta d$. Thus, currently sensed fingerprint data, sensed by the first array has a known relative position to the previously sensed data. Optionally the step of determining a distance is performed by monitoring a rate of motion of a newly captured image from the plurality of images.

The sensing elements 17 of the first sensing pad 100 and second sensing pad 101 need not be of the same sensitivity. For example, when the second sensing pad 101 is used solely for motion detection a low-resolution comparison often suffices and the second sensing pad 101 may be of a lower resolution than the first sensing pad 100. Generally, the lower the resolution of the sensing elements 17 the lower their cost. Therefore, it should be appreciated that the second array 101 for use in determining motion, in some instances, will be of lower sensitivity than the sensing elements 17 of the first sensing pad 100.

The combined sensing and measuring array is disposed within a platen for accepting a fingertip. The platen has an area of approximately 2 cm×4 cm for accepting a fingertip drawn across the sensing elements 17.

The array of sensing elements 17 is connected through an analog switch matrix to facilitate reading the fingerprint image out of the sensing array. Timing and sequencing logic 16 selects each element in the array in turn to produce a partial image of a fingerprint presented to the device. Partial images are mosaiced together to form a complete image of the fingerprint. A signal representing the image is then output directly as an analog signal or, alternatively, converted to a digital signal prior to output from the device. Alternatively, partial images are output from the device and mosaicing of the partial images is performed by a processor external to the first sensing pad 100 and second sensing pad 101.

The first sensing pad 100 second sensing pad 101 further comprise a ground ring and bonding pads 18 designed for connection to other components or to packaging. The ground ring 15 also serves to provide a common ground for the sensing pad. In this role, it is important that the ground ring 15 and integrated circuit elements be designed so as to minimize noise to each sensing element 17. The signal to noise ratio that is acceptable varies between applications and should be adjusted to meet the needs of a specific design. When possible, packaging should be selected to limit noise.

Figure 3B:
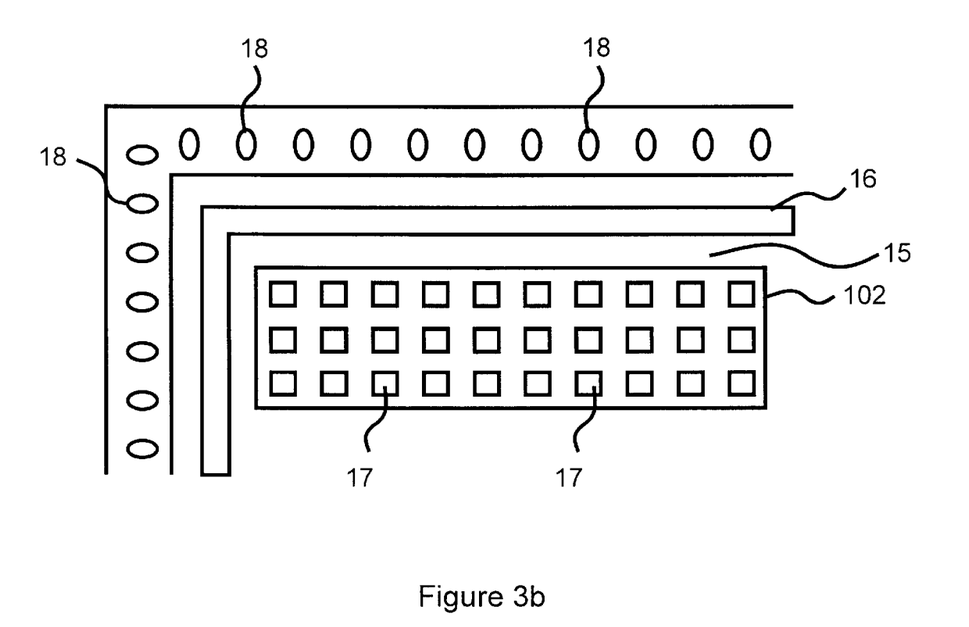
FIG. 3b is a simplified diagram of a sensing device according to the present invention in which a first sensing pad and a second sensing pad are a unified sensing pad.

Referring to FIG. 3b, part of a sensing device on a semiconductor chip is shown comprising a single active matrix addressed sensing pad 102 having an X-Y array of sense elements including r rows (1 to r) with c sensing elements 17 in each row. In practice there may be about 10 rows and 300 columns of regularly spaced elements occupying an area of approximately 0.15 cm×2 cm. Sensing elements 17 are sized and disposed in such a fashion that they are capable of distinguishing the smallest desired feature of a fingerprint. The placement and spacing of the sensor elements allow an image of a fingerprint, once scanned, to contain sufficient features for analysis. Preferably, in order to generate an image for analysis, a sensing element 17 is smaller than half the smallest feature size to be sensed.

In contrast to FIG. 3a, in the sensing device of FIG. 3b the array for determining motion of a sensed fingertip and the sensing array are a same array. The single active matrix addressed sensing pad 102 permits, by virtue of having a series of arrays, both concurrent receipt of fingerprint data and comparison with previously stored data of the fingertip as a fingertip is passed over the sensing pad 102. The device illustrated in FIG. 3b functions in a similar manner to the device illustrated in FIG. 3a.

The reader will appreciate that a plurality of rows r of sensing elements 17 results in a more efficient reconstruction of a fingerprint image. Preferably 2–10 rows r are used.

The unitary device, FIG. 3b, is disposed within a platen for accepting a fingertip. The platen has an area of approximately 2 cm×4 cm for accepting a fingertip that is drawn across the sensing elements 17.

The device of FIG. 3b is electrically connected and driven in a similar manner to the device of FIG. 3a. Image reconstruction also occurs in a similar fashion.

Referring to FIG. 4, an amplifier circuit for use with the present invention is disclosed. Other suitable amplifier circuits may also be used. A distributed diode resistor network 31 is used to protect the amplifier circuit from electrostatic discharge. A low pass filter network 32, shown as a combination of two resistors and a capacitor stabilizes the DC operating point without impacting AC gain of the amplifier circuit. Any low pass filter circuit with similar characteristics may be employed. The cutoff frequency of the filter is set well below 1 Hz to keep gain high for slowly varying signals.

Capacitor 33 having a capacitance of $C_f$ provides feedback necessary to convert the input charge to a proportional voltage. Sensitivity of the amplifier in its passband is set by the choice of $C_f$ as $V_o = Q_i/C_f$, where $Q_i$ is the input charge at sense electrode 20. For example, at $C_f=0.2$ pF, sensitivity of approximately 5 V/pC is achieved. In practice, the capacitance of the input transistor 34 and protection network 31 attenuates the signal, which affects the final design gain of the amplifier and choice of feedback capacitance $C_f$. Thus, it is suggested that some tuning of the circuit be performed during design.

Amplifiers 35 and 36 and associated circuitry provides level shifting and additional voltage gain. Output from the amplifier 36 is selectively switched by on-chip sequential control logic similar to that used in solid state serial memory devices to produce a serialized stream of output signals corresponding to an output of each sensing element 20 at discrete points time, Alternatively, the output from the amplifier is switched by random access logic as is used in random access memory devices and then digitized. The order of the switching and the digitizing may be reversed but so doing requires more logic and is thus more costly.

Figure 5A:
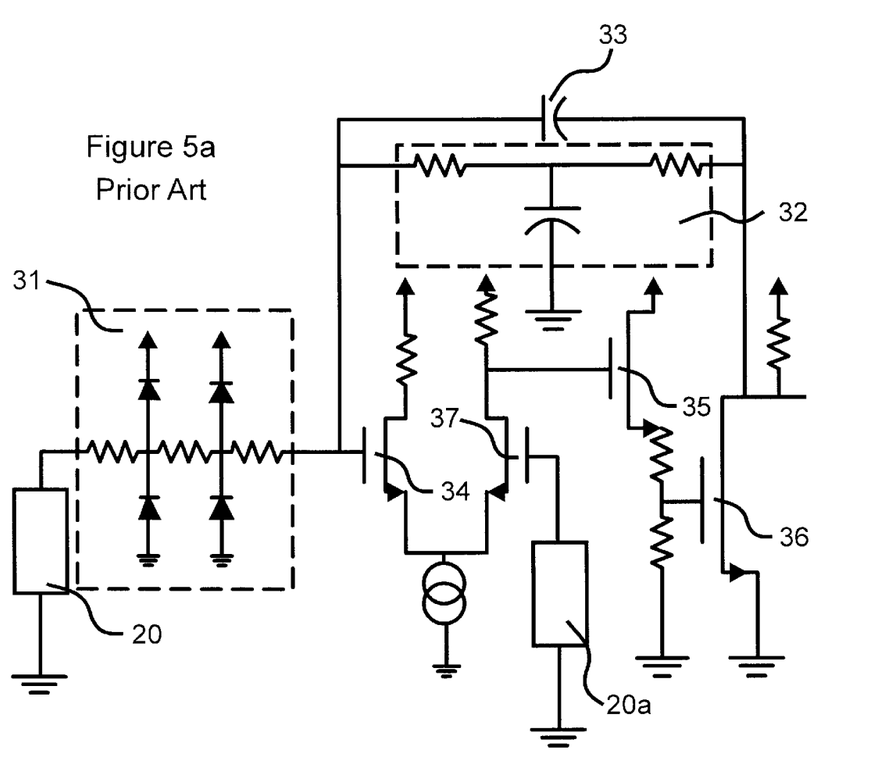
FIG. 5a is a schematic diagram of an alternative amplifier circuit in the form of a differential amplifier for use with the present invention.

Two alternative embodiments for the amplifier circuit are shown in FIG. 5. FIG. 5a shows a true differential amplifier. Though similar to the amplifier circuit of FIG. 4, The transistor 37 is connected to at least an adjacent sensing element 20a. In practice, such a differential amplifier circuit reduces common mode voltages thereby increasing resolution. In FIG. 4, the transistor 37 is connected to ground providing a virtual reference of ground. Thus the circuit of FIG. 4 measures all induced voltages relative to a ground including any common mode voltage induced. Preferably, the ground is a common ground in the form of the ground ring 15. When using the circuit of FIG. 5a with multiple adjacent sensing elements used as a reference, complexity is introduced to the amplifier and potentially added cost.

Figure 5B:
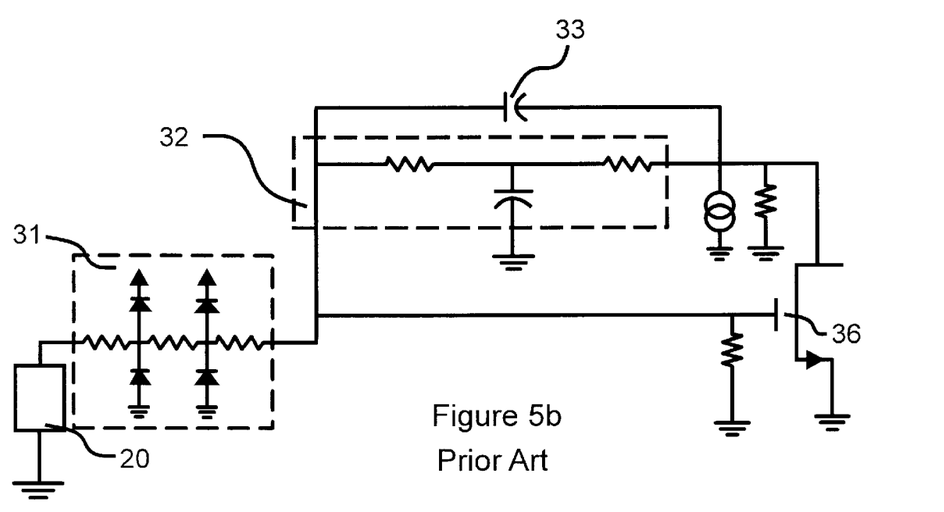
FIG. 5b is a schematic diagram of an alternative amplifier circuit for use with the present invention.

FIG. 5b shows another alternative embodiment for the amplifier circuit. This circuit is very simple and similar to amplification of a current source. By treating the induced charge on the sensing elements as a current source, the number of transistors required is minimized and the yield is effectively increased. The overall circuit comprises electrostatic protection circuitry 31, a low pass filter 32, and an amplifier circuit.

In use the differential amplifier circuit obviates a need to apply a predetermined initial charge to a sensing electrode. Avoiding the initial charging of the sensing electrode simplifies the overall circuit and removes some sources of noise caused by added circuitry necessary for accomplishing the initial charging.

Figure 6:
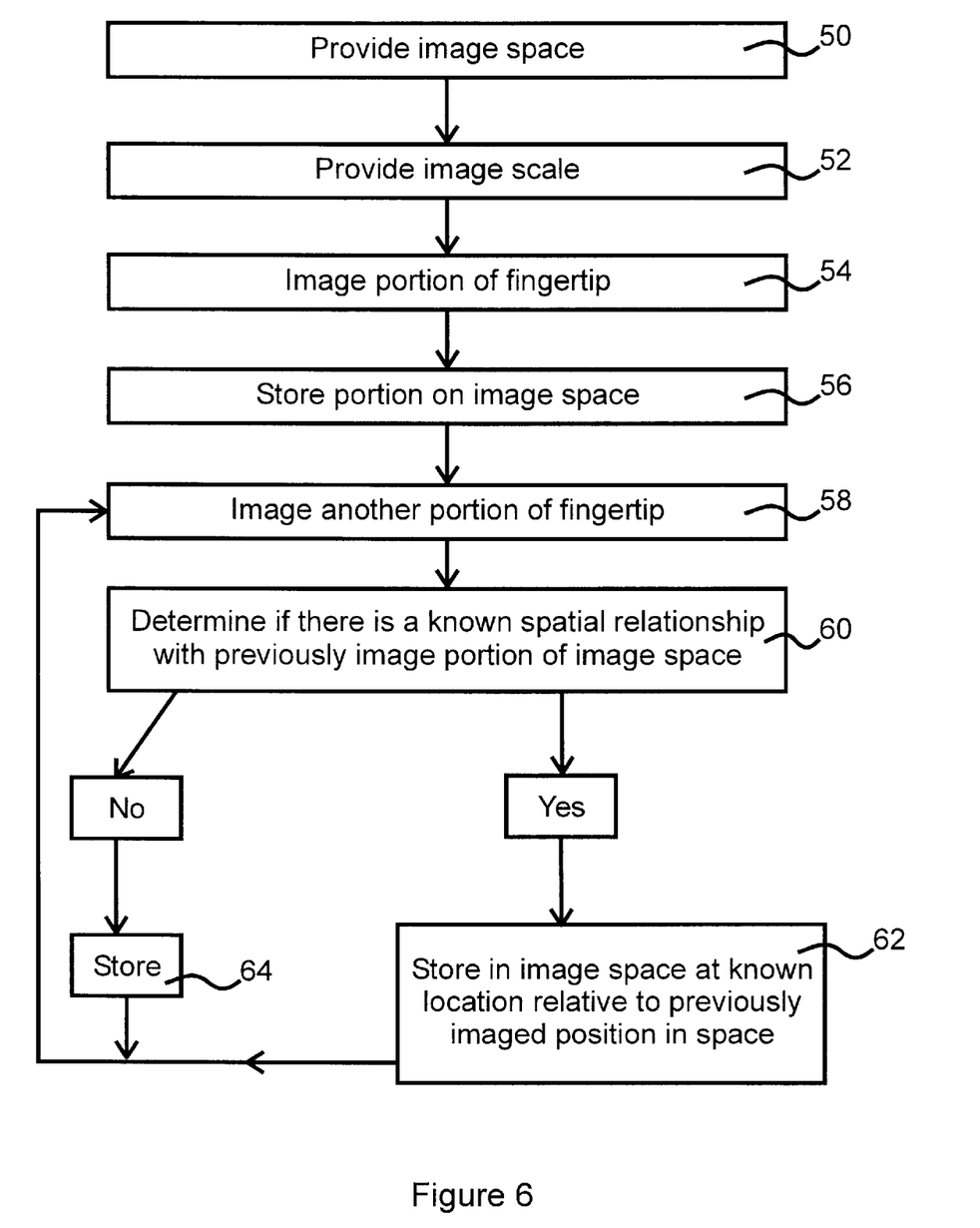
FIG. 6 is a flow chart of a method of processing information from data received from a fingerprint array of sensing elements and measuring array.

Referring to FIG. 6, in a first step an image space 50 is provided followed by an image scale 52. An initial image portion of fingertip is provided 54 and stored 56 within the image space 50. Another portion of a fingertip is then imaged 58.

In a next step a search for a correlation between the initial image and another second image is initiated, that is, it is determined if there is a known spatial relationship between stored images 60. There are two possible results to the search: YES or NO.

In the case of a YES response an image is stored in an image space at a known location relative to a previously imaged portion in space 62 and another portion of a fingertip is then imaged 58. Again it is determined if there is a known spatial relationship between stored images 60. In the case of a NO response the image portion is stored for later reference 64 and another portion of a fingertip is then imaged 58 and it is determined if there is a known spatial relationship between stored images 60. By the use of a suitably programmed processor thresholds for rejection or acceptance of data in determinations of correlation are selectable. After sufficient correlations are found, the data is then assembled using known relations between different image portions and the composite fingerprint image so formed compared to a stored template of fingerprint data. For example, the fingerprint assembly is performed using a simultaneous solution to place all image portions having unknown fixed locations but limited possible locations relative to some other image portions. According to another embodiment, the composite image is assembled through iterative steps of image portion placement and image analysis to determine placement errors.

Figure 7:
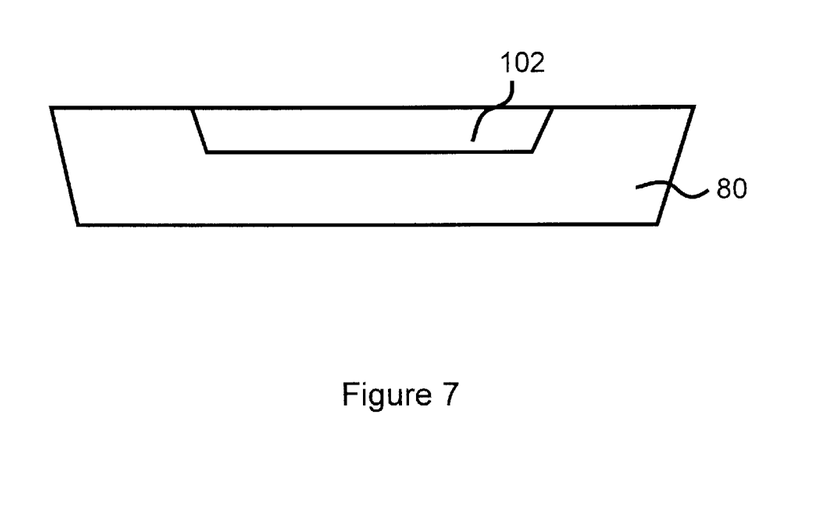
FIG. 7 is a diagram of a unified sensing pad held by a flexible body.

Referring to FIG. 7, the single active matrix addressed sensing pad 102 is supported by a flexible body 80. The flexible body 80 is relatively stiff such that it permits a small amount of movement under pressure, whilst not unduly stressing connections between the sensing pad 102 and associated addressing circuitry. The movement of the sensing pad 102 raises the threshold of force under which a sensing pad 102 is damaged.

Figure 8:
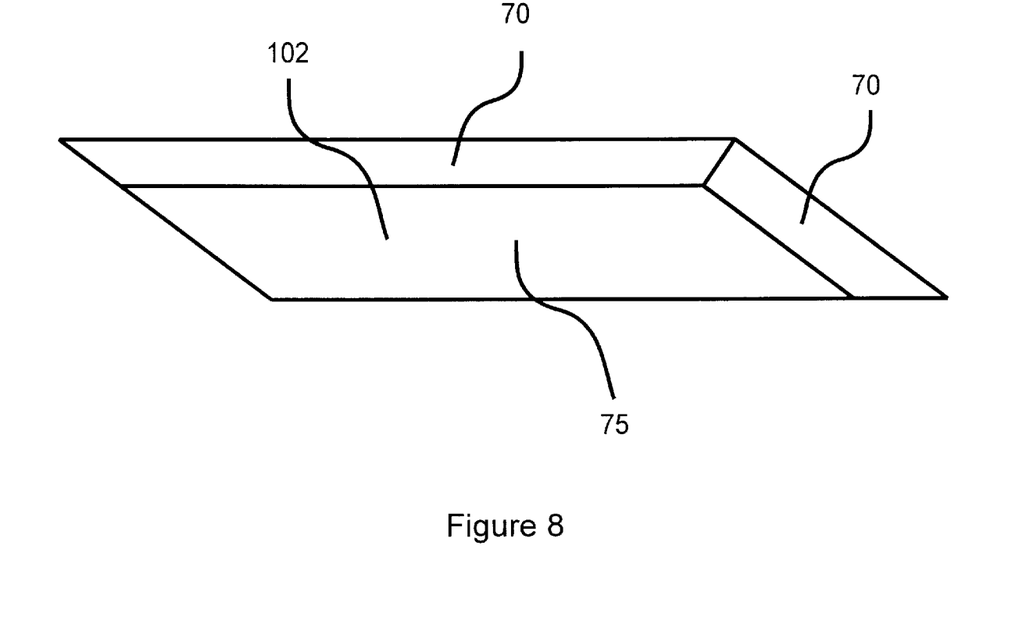
FIG. 8 is a diagram of a countersunk unified sensing pad.

Referring to FIG. 8, the single active matrix addressed sensing pad 102 is recessed within a border having four sides 70, two sides are obscured from view. The recessed sensing pad 102 has a substantially flat exposed surface 75 for receiving a fingertip. The sides 70 of the recess are angled at approximately 45° away from the sensing pad 102 to allow a guided fingertip to flow into the recess and substantially contact the exposed surface 75. The recessed sensing pad 102 serves to reduce the probability of damage due to an accidental blow from a blunt object that does not fit into the recess. In addition, the recess also serves to restrict the amount of pressure exerted by a digit on the sensing pad 102.

Numerous other embodiments may be envisaged without departing from the spirit and scope of the invention.

What is claimed is:

1. A method of imaging a fingerprint comprising the steps of:
   (i) moving a biological surface relative to a first sensing pad and a second sensing pad, each sensing pad including an array of capacitive sensing elements;
   (ii) capturing repeatedly and approximately simultaneously a first image and a second image to result in capturing of:
      a plurality of first images corresponding to different portions of the moving biological surface presented to the first sensing pad, and
      a plurality of second images corresponding to different portions of the moving biological surface presented to the second sensing pad;
   (iii) determining motion of the biological surface relative to the first sensing pad in dependence upon the captured pluralities of first and second images; and
   (iv) constructing an image of the biological surface from the captured plurality of first images and in dependence upon the determined motion, to form a composite image having an area greater than the area of a single captured image from the plurality of first images, absent a step of determining a speed of the biological surface.

2. A method of imaging a fingerprint according to claim 1, wherein the step of determining motion comprises the step of determining a distance between a currently captured image from the plurality of first images and a previously captured image from the plurality of first images.

3. A method of imaging a fingerprint according to claim 2, wherein the step of determining a distance comprises the steps of:
   comparing a currently captured image from the plurality of second images and a previously captured image from the plurality of first images to determine substantially same regions within both images; and
   when substantially same regions are determined within both images, providing a value indicative of a determined distance between the previously captured image from the plurality of first images and the currently captured image from the plurality of first images in dependence upon a known distance between the first and second sensing pads.

4. A method of imaging a fingerprint as defined in claim 1 wherein the step of constructing an image of the biological surface comprises the step of storing the first images within an image space having a known scale, the first images stored at determined distances when the distances are known and image locations within the image space adjusted in dependence upon the determined distances.

5. A method of imaging a fingerprint as defined in claim 4 wherein the step of constructing an image of the biological surface includes the step of determining, in a simultaneous fashion, locations within the image space for each first image relative to other first images having no known spatial relation therebetween.

6. A method of imaging a fingerprint as defined in claim 4 wherein the step of constructing an image of the biological surface includes the step of determining, in an iterative fashion, locations within the image space for each first image relative to other first images having no known spatial relation therebetween.

7. A method of imaging a fingerprint comprising the steps of:
   (i) moving a biological surface relative to a first sensing pad and a second sensing pad, the sensing pads including a capacitive array of sensing elements;
   (ii) capturing a plurality of images of the biological surface, some images of different portions of the biological surface;
   (iii) determining motion of the biological surface relative to the first sensing pad using the captured images; and
   (iv) constructing an image of the biological surface from the captured images to form a composite image, wherein the area of the composite image is greater than the area of a single captured image from the plurality of images,
   wherein the step of moving a biological surface relative to an image reader is performed by moving a biological surface relative to a first sensing pad and a second sensing pad, the sensing pads separated by a known distance;
   wherein the step of capturing a plurality of images of the biological surface comprises capturing first images with the first sensing pad and second images with the second sensing pad;
   wherein the step of determining motion of the biological surface comprises the step of correlating first images with second images; and
   wherein the step of constructing an image of the biological surface comprises the step of storing the first images and the second images within an image space having a known scale, the images stored at determined distances when known and image locations within the image space adjusted in dependence upon known distances, and
   wherein the step of constructing an image of the biological surface includes the step of determining, in a simultaneous fashion, locations within the image space for each first image relative to other first images having no known relation therebetween, absent a step of determining a speed of the biological surface.

* * * * *